United States Patent [19]

Marshall

[11] Patent Number: 5,133,501
[45] Date of Patent: Jul. 28, 1992

[54] LANDSCAPE SPRINKLER SYSTEM WITH ADJUSTABLE RISER

[76] Inventor: William R. Marshall, 344 Hedge Rd., Menlo Park, Calif. 94025

[21] Appl. No.: 699,042

[22] Filed: May 13, 1991

[51] Int. Cl.$^5$ ............................................. B05B 15/08
[52] U.S. Cl. ..................................................... 239/201
[58] Field of Search ............... 239/200, 201, 203, 230, 239/281; 285/298

[56]     References Cited
     U.S. PATENT DOCUMENTS

| | | | |
|---|---|---|---|
| 782,552 | 2/1905 | Glauber | 285/298 |
| 1,833,040 | 11/1931 | Rader | 239/203 |
| 3,083,914 | 4/1963 | Smith et al. | 239/203 |
| 4,007,877 | 2/1977 | Jackson et al. | 239/281 |
| 4,274,592 | 6/1981 | Westhusin | 239/200 |
| 4,519,544 | 5/1985 | Szabo | 239/281 |
| 4,643,523 | 2/1987 | Smedley et al. | 285/298 |

*Primary Examiner*—Andres Kashnikow
*Assistant Examiner*—Karen B. Merritt
*Attorney, Agent, or Firm*—Skjerven, Morrill, MacPherson, Franklin & Friel

[57] ABSTRACT

A landscape sprinkler system employs a first fixed vertical riser, typically attached to an inverted T-coupling, extending from a buried water supply pipe array. A second vertical riser having a sprinkler head connected to its top end and being of smaller diameter than the inner diameter of the first riser is telescopically movable up and down within the first riser to an infinite number of positions relative to the first riser. An annular nut and seal surround the second riser and the nut is threaded on the top of the first riser to seal and hold the second riser thereto. When adjacent shrubbery or landscaping grows to a height above the sprinkler head so as to interfere with the exiting sprinkler stream pattern, the nut is loosenable to adjust the height of the second riser and its connected sprinkler head above the height of the shrubbery and the nut retightened at that new position.

10 Claims, 1 Drawing Sheet

LANDSCAPE SPRINKLER SYSTEM WITH ADJUSTABLE RISER

FIELD OF THE INVENTION

This invention pertains to a landscape sprinkler system. More particularly the invention is directed to a pipe riser adjustable in height to compensate for an increasing growth of plants juxtaposed to the sprinkler system.

BACKGROUND OF THE INVENTION

Over the past few decades professionally or homeowner-installed water sprinkler systems have been employed more and more in home, office and public gardens, landscaped areas and grass lawns. These systems generally employ horizontal runs or arrays of buried galvanized iron pipe of about 1.17 cm (½ inch) in diameter, with fixed pipe risers threaded into and extending from inverted T-unions or couplings between linear runs of the piping. The locations of the risers are dictated by the desired area to be covered by the "throw" of a sprinkler head mounted at the top of the riser. More recently sprinkler systems have been constructed and assembled using horizontal runs of polyvinyl chloride plastic pipe with vertical risers of the same plastic material adhesively bonded into the top end of inverted T-unions connecting the piping runs. Like the galvanized iron pipe embodiments, the horizontal piping risers and the inverted T-unions are normally buried a few inches under the ground surface with the risers and sprinkler heads extending vertically above the ground. While these systems are useful for many years on lawns which, due to periodic cutting, are kept at a level of from about 2-6 cm in height above the ground level, other installations for watering shrubbery or other landscaping directly or for watering lawns from risers located in shrubbery areas, are oft times blocked from effective, even spraying by the normal growth of the shrubbery. This necessitates either periodically cutting back the height of the shrubbery, spoiling its natural top contour, or by installing a larger riser or a riser addition(s) between the existing risers and the sprinkler heads. This may necessitate digging up the ground to expose the union and separating the sprinkler head from the riser. An additional nipple or pipe length may be added and threaded between the inverted T union and the sprinkler head and/or the old and new risers joined by an additional straight vertical union. As plant growth continues more and more extensions are necessary creating more work, as well as an ugly stack of unions and nipples. In the case of plastic pipe a section of the plastic riser must be cut out in place, which is difficult in a mass of shrubbery, allowing a longer piece of plastic riser pipe or a nipple to be added and adhered on a union(s) between the original and a subsequent addition(s). Thus it can be seen that various plumbing tools, particularly including a pair of pipe wrenches or plastic pipe cutting tool(s) and adhesive applicators must be employed to raise the level of the sprinkler head so that its throw (of water) is not interfered with by adjacent growing plants.

Coupling pipes including a so-called "slip joint" have been included in various elbow-type plumbing connection between pipes having different end separations. These are exemplified in U.S. Pat. Nos. 782,552; 2,021,317 with respect to a water closet elbow connection; 1,295,106 concerning a fountain elbow; 1,799,246 for a straight pipe connection with annular tapered packing ring; 1,997,845 for a water meter coupling; 4,258,944 for a plumbing trap; 3,136,570 for a bath tub nipple sprout; and 1,613,887 for a flush tank and bowl.

SUMMARY OF THE INVENTION

The present invention solves the above problems in a simple way with the use of a manual unthreading and rethreading or by use of a Crescent or other parallel edged wrench. A slip joint is provided between a first vertical riser connected to the top of the inverted T-coupling and a second vertical riser movable up and down telescopically in the first vertical riser. The sprinkler head is fixedly connected, normally by threading, to a top of the second riser. A loosenable annular nut and annular seal surround the second riser and are threadable on the top of the first riser. The second riser may thus be positioned at an infinite number of positions with respect to the first riser dependent on the particular location of the nut and seal with respect to the second riser.

In making the vertical installation the second riser is normally set so that a high majority, about 60% to about 95%, of its length at its lower end telescopes into the lower first riser and the nut turned by hand or by a Crescent or other parallel faced wrench to effect a seal between the first and second riser and to hold the top of the second riser (and its sprinkler head) at a fixed level above the first riser and the ground level. When there has been shrubbery growth which tends to interfere with the water being sprayed from the sprinkler head it is a simple, above-the-ground operation to correct the problem. This involves merely 1) loosening the connecting nut, 2) pulling the second riser telescopically upwardly from the first riser, 3) moving the nut and seal upwardly on the second riser a desired amount to a position above the shrubbery top and then reassembling the nut and second riser on the first riser. The sprinkler head is then automatically at a higher position with respect to the first riser, the ground level and, if moved sufficiently, will be above any interfering branches of the shrubbery.

In a preferred plastic embodiment the nut may be of sufficient outside diameter so that the homeowner or landscaper can easily loosen or tighten the nut by hand so there is no need of any tool to adjust the height of the second riser. The sprinkler heads may be of fixed fan-nozzle type or be of the water-impulse type such as those sold under the Rainbird ® trademark or other configurations. The water-impulse type heads move horizontally over fixed or adjustable horizontal fan-shaped or circular areas of from about 30° to about 360°.

DETAILED DESCRIPTION

Figure 1:
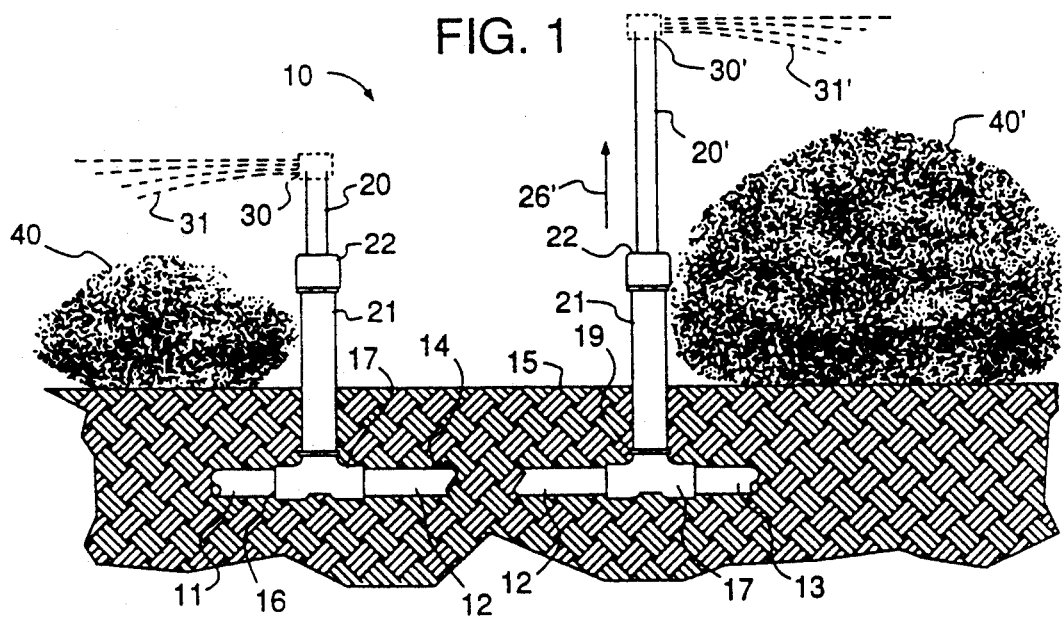
FIG. 1 shows a partial cross-sectional side elevational view of the landscape sprinkler system.
Figure 2:
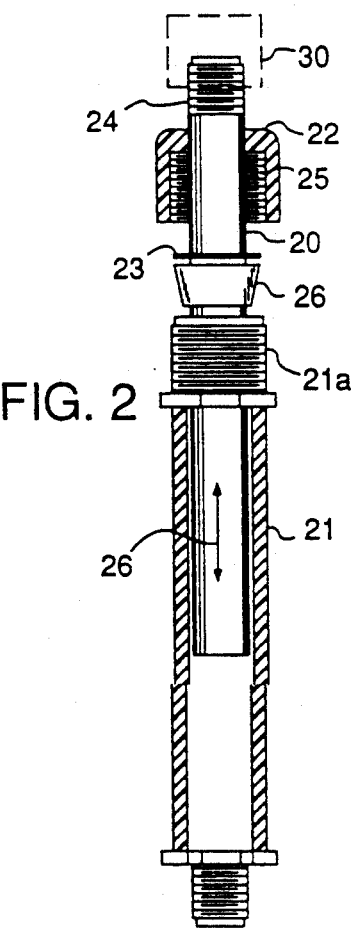
FIG. 2 is a side elevational view of the system risers in a plastic embodiment with the lower riser and connecting nut in section.

FIG. 1 illustrates the landscape water sprinkler system 10 of the invention in which a linear run or array of pipes 11, 12 and 13 are positioned in a trench 14 in a ground surface 15. Each pipe length is connected by threading, or adhesive bonding in the case of polyvinyl chloride piping and unions, to cross-bar openings 16 in an inverted T-union or coupling 17. A first tubular riser 21 of a first relatively large internal diameter extends vertically from a threaded or bonded position in the top end 19 of each of the couplings 17. A second tubular riser 20 having an outer diameter slightly smaller than the inner diameter of the first riser telescopically extends upwardly from the interior of riser 21 so that a sprinkler head 30 is positionable at a desired height above ground level 15 and extends above a shrub 40 or other obstruction so that the shrub top does not interfere with the throw or water spray stream 31 exiting the sprinkler head. Nut 22, which surrounds riser 20 and includes an elastomeric seal typically in the form of a rubber cone washer 26 (FIG. 2), is tightened onto the top threads 21a of riser 21 to seal and fixedly hold riser 20 vertically with respect to riser 21. When bush 40 grows to the size of bush 40' nut 22 may be loosened, the riser 20 (and attached sprinkler head) moved upwardly (arrow 26') to a higher position denoted by the prime marks so that the head 30' and its water spray stream 31' effectively clear the higher shrub 40'. The washer 26 is moved downwardly on riser 20 to a position juxtaposed to the top end of the fixed first bottom riser 21 and the nut 22 rethreaded by its internal threads 25 onto the external threads 21a on riser 21, again sealing the riser assembly at an annular position while holding the second riser 20' at a higher position with respect to the higher bush 40'. A metal backing washer 23 may also be employed to protect the rubber cone washer and aid in distribution of the sealing forces when the washer is sealingly pressed against and between the risers. The up and down telescopic movement of riser 20 with respect to fixed riser 21 is illustrated by double-headed arrow 26. While this embodiment has been discussed in terms of raising riser 20 there may be occasions when one wishes to plant a new smaller bush or severely cut back a bush, in which event the riser 20 may be lowered and resealed so that the risers do not extend too high above the bush creating an unaesthetic appearance and subjecting the spray stream to unwanted wind effects. It is to be understood that the interior of the risers are only subject to water main pressure when a valve (not shown) is opened in a main water supply line connected to pipe 11 or 13. The sealing provided by the nut and seal between the two risers merely prevents water from squirting out at the juncture between the risers while the water is flowing upwardly through the risers to the sprinkler heads.

It is contemplated that the polyvinyl chloride or other plastic piping and unions may be other than the 1.27 cm (½ inch) size. They also may be about 1.90 cm (¾ inch). The risers with accompanying nut and seal may be sold in kit form typically in three sizes so that the outer bottom fixed riser and top movable riser each have an about 10–20 cm length or an about 20–40 cm length or an about 40–80 cm length.

Figure 3:
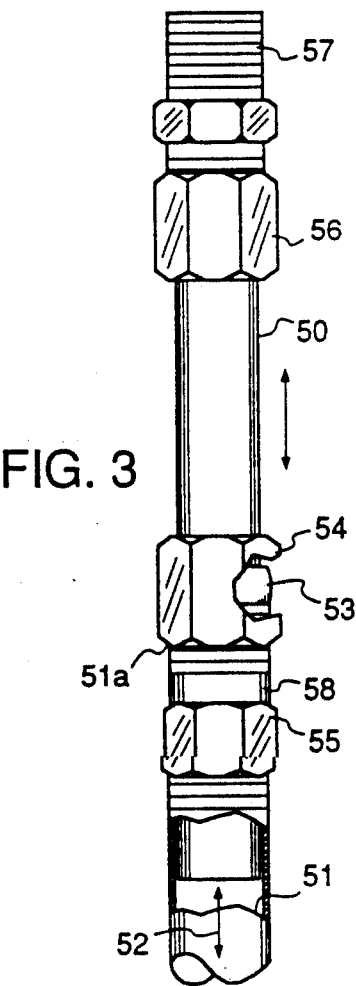
FIG. 3 is a side elevational view of a copper riser embodiment of the invention with a cut-away nut section showing a metal seal ring.

As shown in FIG. 3 the risers assembly may also be constructed of galvanized iron or copper pipe where the fixed riser 51 is threaded or brazed to or otherwise connected to a pipe length (not shown) and movable riser 50, also made of iron or copper material, telescopes into the interior of riser 51 as indicated by double-headed arrow 52. A metal compression seal ring 53 is wrench tightened by the turning of nut 54 on outer threads 51a of pipe 51 or on a threaded male/female connection or nipple 58 attached to pipe 51 by nut 55. Connector 56 is employed to mount the upper end of riser 50 and provides an upper threaded end onto which a sprinkler head is threaded. In some cases the seal 53 may actually crimp onto the pipe riser 50 in which event it may be necessary to cut off an end of the riser 50 and place a new compression seal over the riser after the riser 50 has been extended from riser 51. Alternatively, a rubber washer similar to that shown in FIG. 2 may be employed to seal and reseal risers 50 and 51.

The above description of embodiments of this invention is intended to be illustrative and not limiting. Other embodiments of this invention will be obvious to those skilled in the art in view of the above disclosure.

I claim:

1. A landscape sprinkler system comprising:
   a fixed water supply piping array extending laterally in a trench in a ground surface;
   a series of inverted T-couplings in the trench, each coupling including a cross-bar and a vertical base, the cross-bar of each of said inverted T-couplings connected to the joining laterally extending piping lengths of said array in the trench;
   a first vertical riser fixedly extending vertically from the vertical base of at least one of said inverted T-couplings to a position above the ground surface, the first vertical riser having an internal diameter;
   a second vertical riser having an outer diameter less than the internal diameter of said first vertical riser and movable vertically up and down telescopically in each first vertical riser;
   a sprinkler spray head fixedly connected to a top of the second riser;
   means for threadedly connecting said second riser to a threaded top end of said first riser at a position above the ground surface and at an infinite number of positions of said second riser with respect to said first riser, said second riser and said sprinkler spray head being adjustable in height with respect to said first riser and the ground surface such that water exiting said sprinkler spray head vertically clears landscaping of various heights adjacent to any particular one of said sprinkler spray heads; and
   in which said above ground surface means for threadedly connecting may be unthreaded to loosen said second riser with respect to said first riser and wherein said second riser may be moved telescopically to another vertical position with respect to said first riser dependent on the then grown height of the landscaping.

2. The system of claim 1 wherein said sprinkler spray head is of the water-impulse type which repeatedly moves horizontally over a horizontal arc of up to 360°.

3. The system of claim 1 in which said couplings, said piping lengths and said risers are constructed of polyvinyl chloride plastic.

4. The system of claim 1 in which said means for threadedly connecting comprises said threaded top end on said first riser, a captured threaded nut on said second riser and an elastomeric annular washer movable to various linear positions on and surrounding said second riser, such that upon threading said threaded nut on said first riser threaded top end, said washer is sealingly pressed against said second riser and the internal diameter of said first riser to fixedly hold and seal said second riser with respect to said first riser.

5. The system of claim 4 in which said annular washer is a rubber cone washer and further including a flat friction washer seating on an upper end of said cone washer and in contact with said nut to compress said cone washer when said nut is threaded on said first riser threaded top end.

6. The system of claim 1 in which said first riser is a copper pipe threaded at both ends and said second riser is a copper pipe threaded only at its upper end and wherein said means for fixedly connecting comprises a threaded nipple connected to the threaded top end of said first riser, and a captured nut and metal seal ring surrounding said second riser at any position along the second riser length wherein said nut is threaded on said nipple to hold and seal said seal ring to said second riser in a prescribed position with respect to said nipple.

7. A landscape sprinkler kit for connection to a fixed water supply pipe extending laterally in a trench in a ground surface comprising:
 a first vertical riser having a first lower end threadedly securable into the water supply pipe and a second threaded upper end positionable above the ground surface;
 a second vertical riser having an outer diameter less than the diameter of said first vertical riser and having a lower end movable vertically up and down telescopically in said first vertical riser;
 means on an upper end of said second vertical riser for mounting a sprinkler spray head thereon;
 means for threadedly connecting said second vertical riser to the upper threaded end of said first vertical riser at any one of an infinite number of positions of said second vertical riser with respect to said first vertical riser above ground surface, such that in use said second vertical riser and an attached sprinkler spray head are adjustable in height with respect to said first vertical riser and above the ground surface so that water exiting from the sprinkler spray head vertically clears adjacent landscaping; and
 in which the means for threadedly connecting above the ground level may be unthreaded to loosen said second vertical riser with respect to said first vertical riser and wherein said second vertical riser may be telescopically moved to another vertical position with respect to said first vertical riser dependent on the then grown height of the landscaping.

8. The kit of claim 7 wherein said sprinkler spray head is of the water-impulse type which repeatedly moves horizontally over a horizontal arc of up to 360°.

9. The kit of claim 7 in which said means for fixedly connecting comprises the threaded upper end on said first riser, a captured threaded nut on said second riser and an elastomeric annular washer movable to various linear positions on and surrounding said second riser, such that upon threading said threaded nut on said first riser threaded upper end, said washer is sealingly pressed against said second riser and the inner diameter of said first riser to fixedly hold and seal said second riser with respect to said first riser.

10. The kit of claim 7 in which said second vertical riser and said first vertical riser have a length selected from a group of lengths consisting of about a 10–20 cm length, about a 20–90 cm length, and about a 40–80 cm length.

* * * * *